US00RE39726E

(19) United States
(12) Reissued Patent
Lin

(10) Patent Number: US RE39,726 E
(45) Date of Reissued Patent: Jul. 17, 2007

(54) WASTE BIN STRUCTURE

(76) Inventor: Tsong-Yow Lin, No. 57-1, Yung Ho Street, Yung-Ho Village, Ta Tu Hsiang, Taichung Hsien (TW)

(21) Appl. No.: 10/772,178

(22) Filed: Feb. 4, 2004

Related U.S. Patent Documents

Reissue of:
(64) Patent No.: 6,345,725
Issued: Feb. 12, 2002
Appl. No.: 09/770,752
Filed: Jan. 19, 2001

(51) Int. Cl.
*B65D 43/26* (2006.01)

(52) U.S. Cl. ..... 220/263; 220/828; 220/908
(58) Field of Classification Search ..... 220/263, 220/828, 908, 264, 849, 378, 262, 260, 908.1, 220/23.83, 23.86, 23.87, 254.1, 254.3, 254.5, 220/254.6, 817, 818, 819, 826, 831
See application file for complete search history.

(56) References Cited

U.S. PATENT DOCUMENTS

| | | | | |
|---|---|---|---|---|
| 966,145 | A | 8/1910 | Wilder | |
| 1,012,346 | A | 12/1911 | Fraser | |
| 1,237,016 | A | 8/1917 | Brown | |
| 1,265,148 | A | 5/1918 | Warren | |
| 1,379,677 | A | 5/1921 | Brunhoff | |
| 1,461,253 | A | 7/1923 | Owen | |
| 1,489,447 | A | 4/1924 | Leeb | 312/23 |
| 1,507,040 | A | 9/1924 | Zifferer | |
| 1,515,989 | A | 11/1924 | Banes | |
| 1,615,879 | A | 2/1927 | Leppert | 220/263 |
| 1,639,992 | A | 8/1927 | Geibel | 220/263 |
| 1,703,509 | A | 2/1929 | Chandlee | |
| 1,714,332 | A | 5/1929 | Ullrich | 220/263 |
| 1,799,621 | A | 4/1931 | Shaw | |
| 1,820,555 | A | 8/1931 | Buschman | |
| 1,881,120 | A | 10/1932 | Fessler et al. | |
| 1,891,651 | A | 12/1932 | Padelford et al. | |
| 1,966,323 | A | 7/1934 | Von Elm | |
| 2,016,558 | A | 10/1935 | Redrup | |
| D102,512 | S | 12/1936 | Stallings et al. | |
| 2,071,486 | A | 2/1937 | Wright | 220/263 |
| 2,096,578 | A | 10/1937 | Flanagan | |
| 2,106,892 | A | 2/1938 | Meyer | 220/263 |
| D108,642 | S | 3/1938 | Geisel | |
| 2,170,604 | A | 8/1939 | Creesy et al. | |
| D118,374 | S | 1/1940 | Kamenstein | |
| 2,195,033 | A | 3/1940 | Lehman | |
| D120,270 | S | 4/1940 | Martinez | |
| 2,216,279 | A | 10/1940 | Packer | |
| 2,242,698 | A | 5/1941 | Evitt | |
| 2,246,975 | A | 6/1941 | Geibel | |
| 2,255,972 | A | 9/1941 | Harvard | |

(Continued)

FOREIGN PATENT DOCUMENTS

| | | | |
|---|---|---|---|
| DE | 4132958 A1 | 5/1992 | 220/262 |
| DE | 20001431 U1 | 6/2000 | 220/262 |
| JP | 2000008700 A | 1/2000 | |
| TW | 322904 | 12/1997 | |

*Primary Examiner*—Stephen Castellano
(74) *Attorney, Agent, or Firm*—Alan Kamrath; Kamrath & Associates PA

(57) ABSTRACT

A waste bin structure includes an inner barrel, an outer barrel, and a barrel lid. The lid cover includes an inner cover, an outer cover, and a locking portion. The inner cover is provided with a touch portion that may be pressed to pivot the inner cover upward independently. The outer barrel has a connecting portion defining a hanging recess, and the inner barrel is provided with a hanging hook portion secured in the hanging recess. The outer barrel is provided with a hood to form a handle portion of the outer barrel, so that the outer barrel is portable. The lid cover of the waste bin structure can be opened by a triggering action, and alternatively by a stepping action of a foot.

15 Claims, 14 Drawing Sheets

U.S. PATENT DOCUMENTS 2,308,398 A 1/1943 Stevens
2,311,835 A 2/1943 Johnson
2,325,897 A 8/1943 Waltman ..... 220/264
D145,970 S 11/1946 Bloomfield
D147,646 S 10/1947 Footlik
D151,986 S 12/1948 Hamilton
2,475,125 A 7/1949 Brownell
2,547,089 A 4/1951 Oberst ..... 16/66
2,563,456 A 8/1951 Brownell
2,904,210 A 9/1959 Grossman
2,907,491 A 10/1959 Gunn
2,910,206 A 10/1959 Hodgson
2,920,338 A 1/1960 Falk
D187,300 S 2/1960 Tupper
D187,305 S 2/1960 Leominster
2,946,474 A 7/1960 Knapp ..... 220/23.87
D191,546 S 10/1961 Garner
D197,007 S 12/1963 Bringhton
3,450,297 A 6/1969 Clerk
3,866,791 A 2/1975 Roper et al.
D241,499 S 9/1976 Raftery
4,081,105 A 3/1978 Dagonnet et al.
D256,423 S 8/1980 Bacskay et al.
D261,720 S 11/1981 Brazis
4,361,247 A 11/1982 Williams
4,363,417 A 12/1982 Rhoades et al.
4,445,619 A 5/1984 Kubic et al.
4,473,170 A 9/1984 Ciancimino
4,489,810 A 12/1984 Curtis
4,629,167 A 12/1986 Kimura et al. ..... 267/226
4,785,964 A * 11/1988 Miller et al. ..... 220/263
4,877,226 A 10/1989 Taylor
4,913,308 A * 4/1990 Culbertson ..... 220/495.09
4,953,744 A 9/1990 Koyama
D312,160 S 11/1990 Calvi
D319,905 S 9/1991 Hotchkiss
D321,575 S 11/1991 Corps
D322,350 S 12/1991 Craft, Jr. et al.
5,082,139 A 1/1992 Quam
D327,965 S 7/1992 Chelee
D328,510 S 8/1992 Brussing
D329,929 S 9/1992 Knoedler et al.
5,142,738 A 9/1992 Ojima
5,163,574 A * 11/1992 Sosan ..... 220/264
5,170,904 A * 12/1992 Neuhaus ..... 220/262
D332,334 S 1/1993 Jones
D332,852 S 1/1993 Delmerico
D333,024 S 2/1993 Van Buiten
D333,025 S 2/1993 Doherty
D333,897 S 3/1993 Ward
D335,561 S 5/1993 Mihyar
D335,562 S 5/1993 Evans
5,211,269 A 5/1993 Ohshima
5,230,525 A * 7/1993 Delmerico et al. .... 280/47.131
5,237,708 A 8/1993 Zamoyski ..... 4/246.3
5,249,693 A * 10/1993 Gillispie et al. ..... 220/263
5,269,087 A 12/1993 Johnston
D343,486 S 1/1994 Kimport
5,295,607 A * 3/1994 Chang ..... 220/495.07
5,350,079 A 9/1994 Larson et al.
5,356,025 A 10/1994 Renault
D352,144 S 11/1994 Brookshire et al.
D355,060 S 1/1995 Bernstein et al.
5,382,108 A 1/1995 Ojima
5,385,259 A * 1/1995 Bernstein et al. ..... 220/495.11
5,440,978 A 8/1995 O'Brien et al.
5,474,201 A 12/1995 Liu
D368,563 S 4/1996 Brightbill et al.
5,531,348 A * 7/1996 Baker et al. ..... 220/264
D377,554 S 1/1997 Adriaansen
D381,784 S 7/1997 Keller et al.
D393,334 S 4/1998 Presnell et al.
D401,028 S 11/1998 Ahern, Jr. et al.
5,842,595 A 12/1998 Williams
5,960,983 A 10/1999 Chan
D418,957 S 1/2000 Rashid
6,010,024 A 1/2000 Wang
6,024,238 A 2/2000 Jaros ..... 220/264
D431,700 S 10/2000 Roudebush
D431,702 S 10/2000 McKeown et al.
D435,951 S 1/2001 Yang et al.
6,178,085 B1 1/2001 Leung
D439,717 S 3/2001 Konieczny
6,206,281 B1 3/2001 Leung
D441,160 S 4/2001 Lin
D442,330 S 5/2001 Cousins
D446,375 S 8/2001 Daams
D447,304 S 8/2001 Niemeyer
D447,308 S 8/2001 Lin
D447,611 S 9/2001 Lin
D450,901 S 11/2001 Lin
D453,252 S 1/2002 Lin
D453,253 S 1/2002 Lin
6,336,252 B1 1/2002 Bando
D453,600 S 2/2002 Lin
D453,870 S 2/2002 Lin
6,345,725 B1 2/2002 Lin ..... 220/263
D454,239 S 3/2002 Lin
D460,595 S 7/2002 Lin
D465,629 S 11/2002 Lin
D465,630 S 11/2002 Lin
D465,893 S 11/2002 Lin
D465,894 S 11/2002 Lin
D466,265 S 11/2002 Lin
D466,667 S 12/2002 Lin
D467,696 S 12/2002 Rashid
D468,500 S 1/2003 Lin
6,510,588 B2 1/2003 Eromaki
D470,639 S 2/2003 Quan
D472,686 S 4/2003 Lin
D472,687 S 4/2003 Lin
D472,688 S 4/2003 Lin
D476,126 S 6/2003 Lin
D476,128 S 6/2003 Lin
D476,458 S 6/2003 Lin
D476,460 S 6/2003 Lin
D476,788 S 7/2003 Lin
2002/0079315 A1 6/2002 Yang
2002/0092853 A1 7/2002 Wang
2003/0173369 A1 9/2003 Nikolaus et al.
2003/0201265 A1 10/2003 Lin ..... 220/254.3
2003/0201267 A1 10/2003 Yang et al.
2003/0201268 A1 10/2003 Lin ..... 220/263
2004/0016756 A1 1/2004 Lin ..... 220/263

* cited by examiner

WASTE BIN STRUCTURE

Matter enclosed in heavy brackets [ ] appears in the original patent but forms no part of this reissue specification; matter printed in italics indicates the additions made by reissue.

FIELD OF THE INVENTION

The present invention relates to a waste bin structure, and more particularly to a waste bin structure that can be opened by a triggering action, and by a stepping action of a user's foot so that the waste bin structure has dual functions and effects.

DESCRIPTION OF THE RELATED PRIOR ART

A conventional waste bin is used for storing wastes or rubbish therein. However, the conventional waste bin is not provided with a cover or lid, so that the wastes are directly in contact with the air of the ambient environment. Therefore, when the wastes [are organism] *include organisms* that are derived from the kitchen, for example, the odor of the wastes will leak from the waste bin to the ambient environment, thereby causing uncomfortable [sensation] *sensations* to [the] people. In addition, the conventional waste bin is not provided with a cover or lid, so that the wastes are exposed to the ambient environment, thereby decreasing the aesthetic appearance of the conventional waste bin.

A first conventional covered waste bin includes an upper cover formed with a protrusion so that the user can hold the protrusion for removing the upper cover. However, the user has to operate the upper cover manually, thereby causing inconvenience to the user.

A second conventional covered waste bin includes a single cover piece. However, its airtight effect is not sufficient, so that the odor of the wastes easily leaks from the waste bin to the ambient environment.

A third conventional covered waste bin includes a pedal having a bottom pivoted with a linking lever set, whereby the pedal can be stepped so that the linking lever set is driven to push an upper cover for removing the upper cover. The third conventional covered waste bin has a better airtight effect, however, it is not easy to clean the waste bin.

A fourth conventional covered waste bin includes a barrel lid having a trigger point which may be pressed so that the locking set mounted in the barrel lid can be locked or released, so as to close or open the upper cover. However, the operation of the barrel lid is not suitable for a large waste bin, so that the volume of the waste bin is limited.

SUMMARY OF THE INVENTION

The present invention has arisen to mitigate and/or obviate the disadvantage of the conventional waste bin.

The primary objective of the present invention is to provide a waste bin structure which can be opened by a triggering action, and by a stepping action of a user's foot so that the waste bin structure has dual functions and effects.

Another objective of the present invention is to provide a waste bin structure which can be opened by a triggering action, or by a stepping action of a user's foot, depending on the volume of wastes, by means of the pivotal connection of an inner cover and an outer cover of a barrel cover.

A further objective of the present invention is to provide a waste bin structure, wherein the gap between the inner barrel and the outer barrel can be covered by means of the pivotal mounting of the outer cover of the barrel cover, thereby preventing the wastes from falling into the gap between the inner barrel and the outer barrel.

A further objective of the present invention is to provide a waste bin structure which may be portable by mounting of a handle portion [of] *to* the outer barrel.

A further objective of the present invention is to provide a waste bin structure which includes an inner barrel that can be removed to be cleaned. In addition, the inner barrel is provided with a hanging hook for hanging the inner barrel [into] *in* the outer barrel without wobbling. Further, the hanging hook of the inner barrel may also function as a handle, so that the inner barrel is portable.

Thus, in accordance with the present invention, there is provided a waste bin structure comprising:

an inner barrel, an outer barrel, and a barrel lid, the inner barrel received in the outer barrel, a connecting portion mounted on a rear end of an inner rim of the outer barrel, the connecting portion having a top face integrally formed with a cover, the cover having a front end provided with two hanging shafts, the barrel lid having a distal end provided with two hanging ears each snapped on the hanging shaft of the cover so that the barrel lid covers a top edge of the outer barrel, the barrel lid provided with a locking portion that is opened and closed by triggering, so that the barrel lid can be opened by *a* triggering action, the connecting portion of the outer barrel having a center defining a channel, a linking lever received in the channel and having a first end formed with a horizontal bent portion passing through a protruding ear of a bottom of a rear end of the barrel lid, and a second end passing through a front end of the outer barrel and pivoted with a pedal which may be stepped *on* so that the linking lever pushes the lid cover to pivot upward;

the improvement comprising:

the lid cover including an inner cover and an outer cover, the inner cover placed in an inner rim of the outer cover, the locking portion of the lid cover mounted between the inner cover and the outer cover, the inner cover having a front end provided with a touch portion that may be pressed so as to pivot the inner cover to move upward independently, the top face of the connecting portion of the outer barrel having a front end defining a hanging recess, the inner barrel having a rear side having a top edge provided with a hanging hook portion secured in the hanging recess of the connecting portion of the outer barrel, the outer barrel having a back side provided with a hood, a plurality of screws each in turn extending through the hood, the outer barrel, and the connecting portion, so that the connecting portion is secured inside of a top portion of the outer barrel, and the hood is secured outside of the top portion of the outer barrel to form a handle portion of the outer barrel, such that the outer barrel is portable, and the lid cover of the waste bin structure can be opened by a triggering action, and by a stepping action of a foot.

Further benefits and advantages of the present invention will become apparent after a careful reading of the detailed description with appropriate reference to the accompanying drawings.

DETAILED DESCRIPTION OF THE INVENTION

Figure 1:
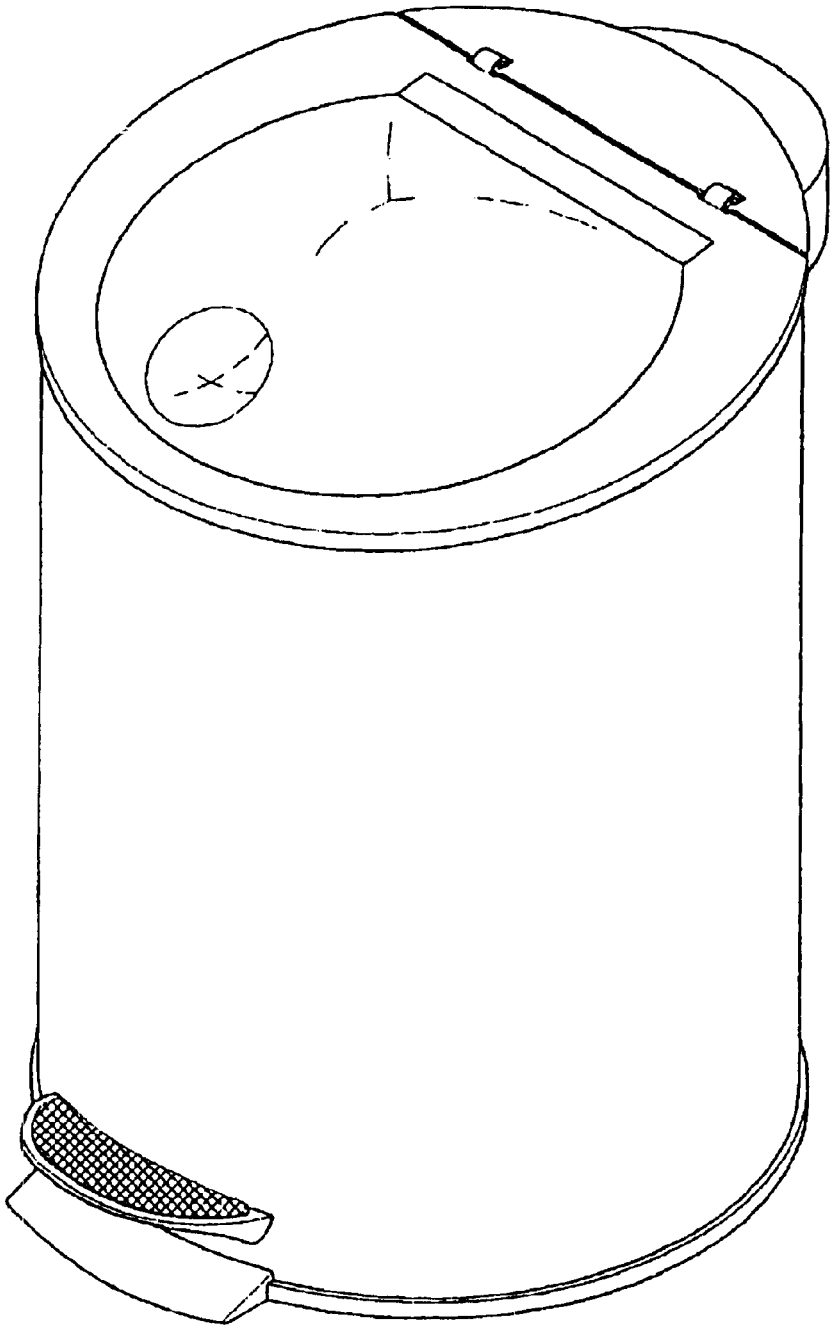
FIG. 1 is a perspective view of a waste bin structure in accordance with the present invention.
Figure 2:
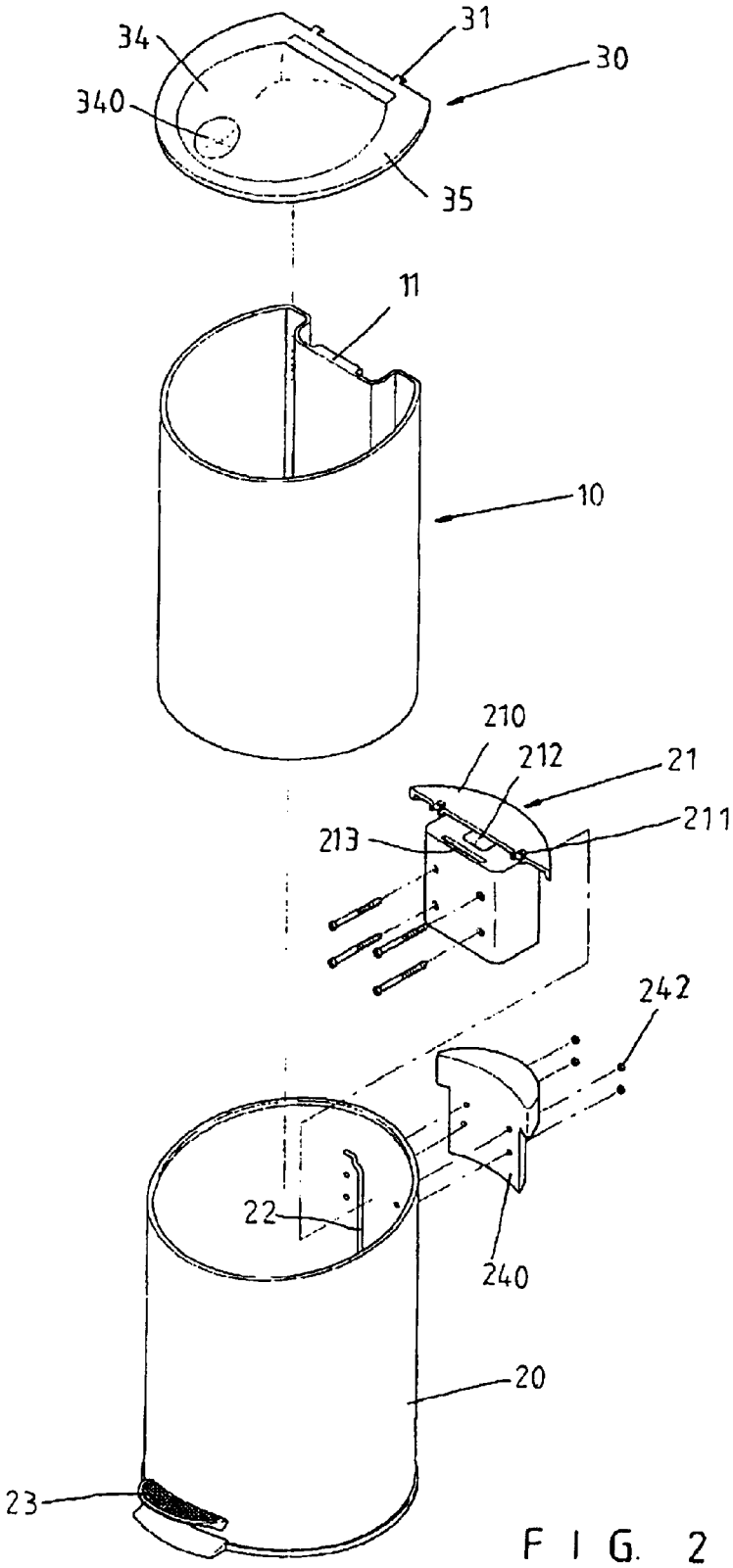
FIG. 2 is an exploded perspective view of the waste bin structure as shown in FIG. 1.
Figure 3:
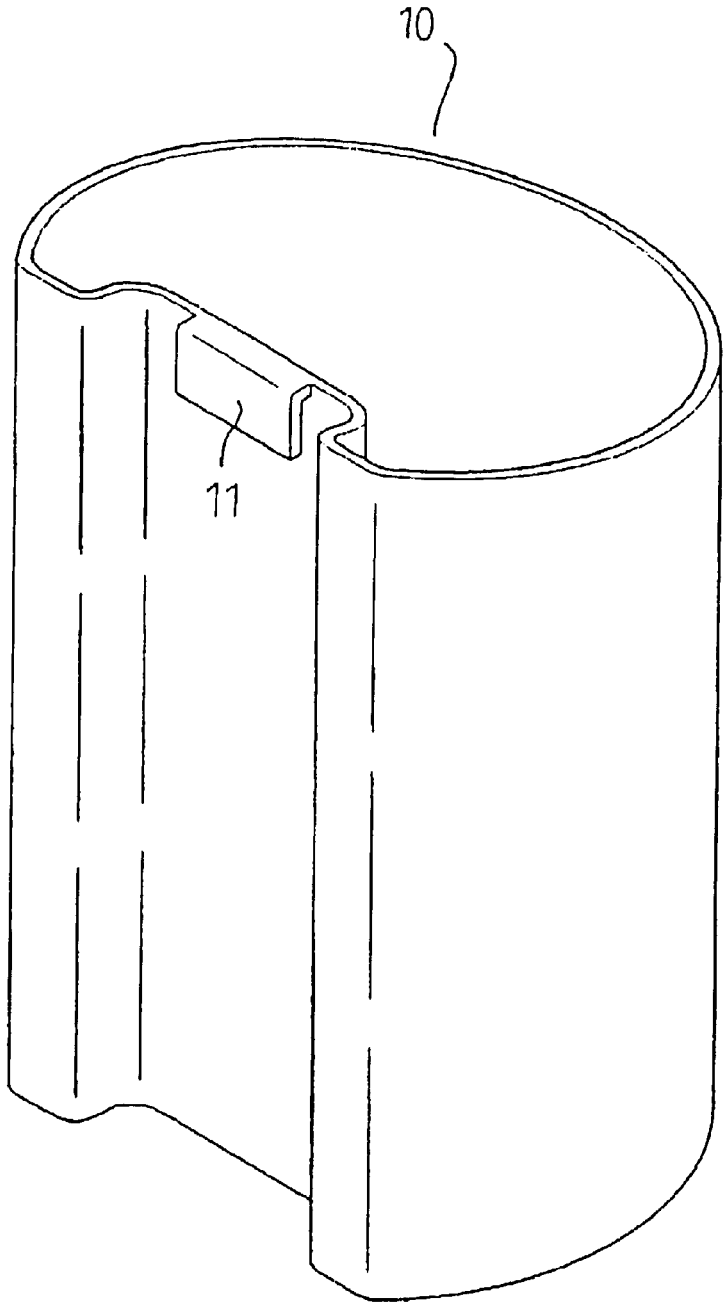
FIG. 3 is a perspective view of an inner barrel of the waste bin structure in accordance with the present invention.
Figure 4:
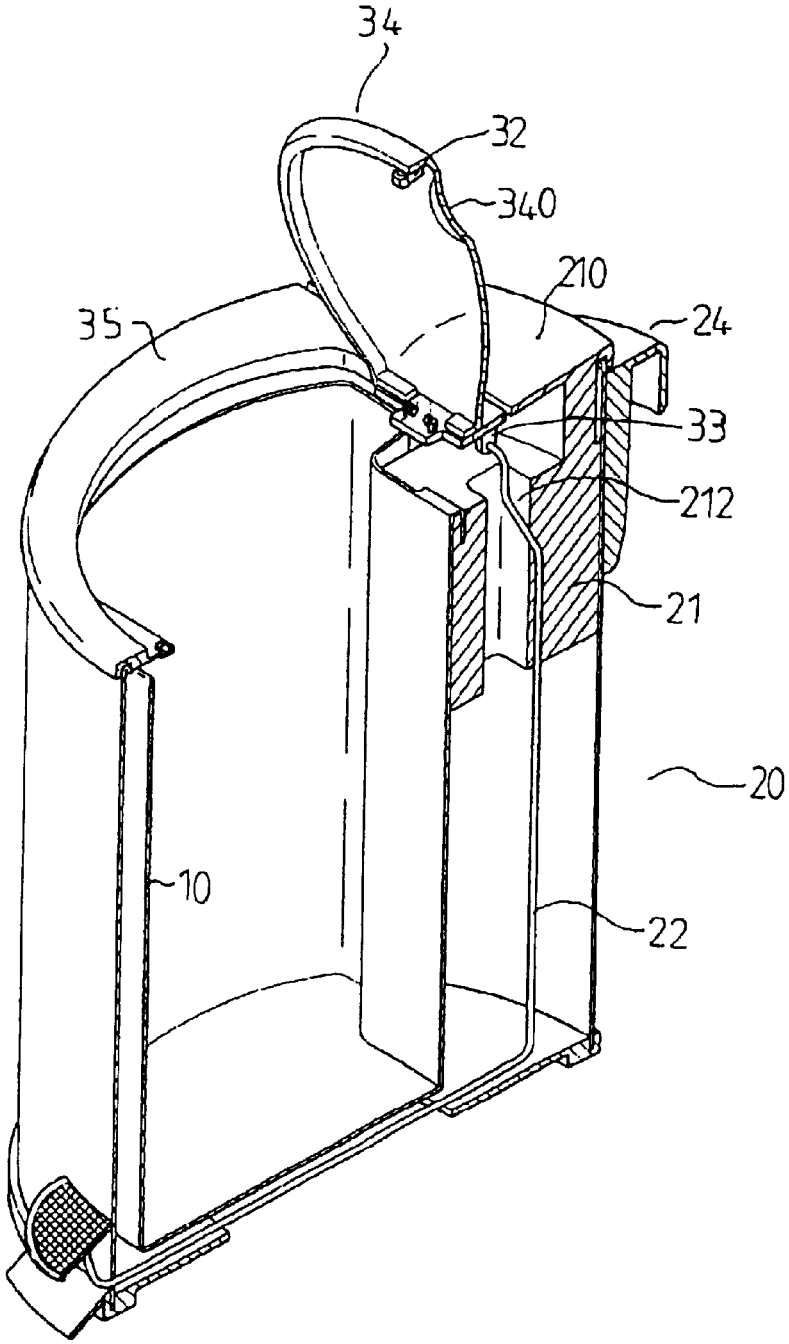
FIG. 4 is a partially cut-away cross-sectional view of the waste bin structure as shown in FIG. 1.
Figure 5:
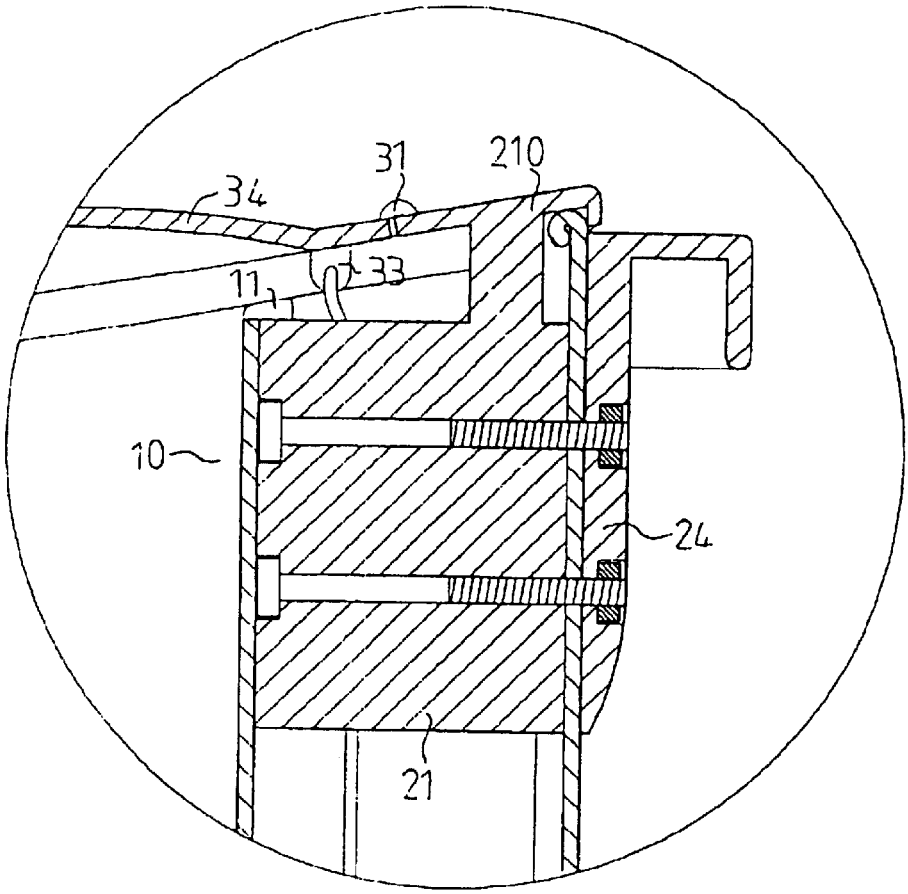
FIG. 5 is a [top plan] *partial* cross-sectional view of the waste bin structure as shown in FIG. 1.
Figure 6:
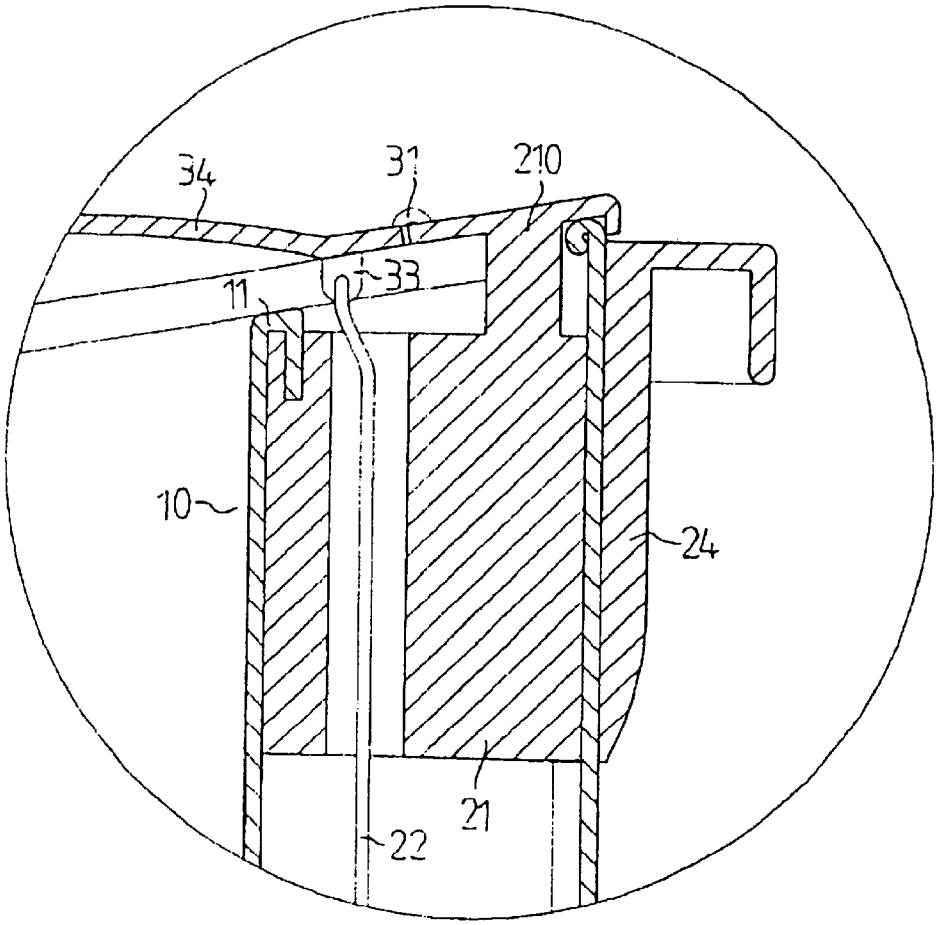
FIG. 6 is a [top plan] *partial* cross-sectional view of the waste bin structure as shown in FIG. 1.
Figure 7:
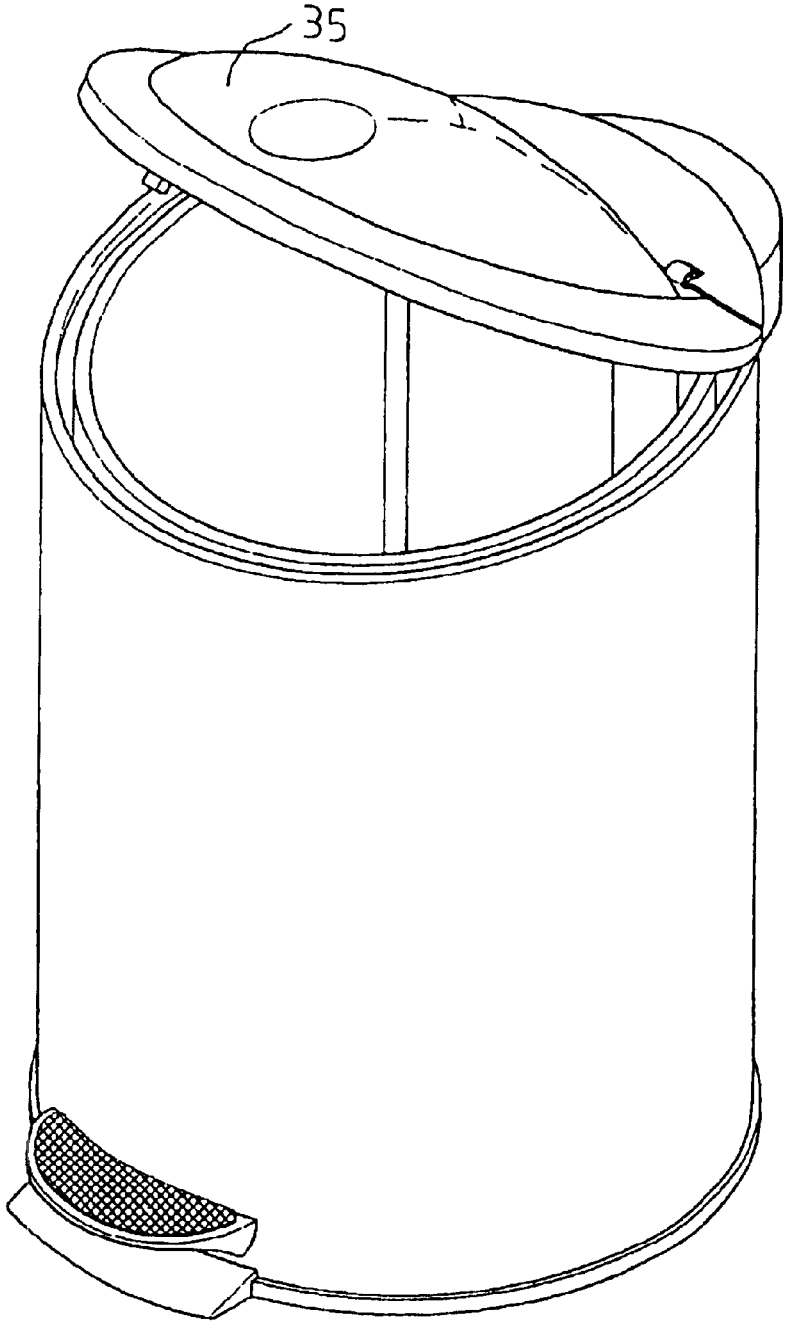
FIG. 7 is a schematic operational view of the waste bin structure as shown in FIG. 1 in use.

Referring to the drawings and initially to FIGS. 1–6, a waste bin structure in accordance with the present invention comprises an inner barrel 10, an outer barrel 20, and a barrel lid 30. The inner barrel 10 is received in the outer barrel 20. A connecting portion 21 is mounted on the rear end of the inner rim of the outer barrel 20. The connecting portion 21 has a top face integrally formed with a cover 210. The cover 210 has a front end provided with two hanging shafts 211. The barrel lid 30 has a distal end provided with two hanging ears 31 each snapped on the hanging shaft 211 of the cover 210 so that the barrel lid 30 covers the top edge of the outer barrel 20. The barrel lid 30 is provided with a locking portion 32 that is opened and closed by a triggering action, so that the barrel lid 30 can be opened by the triggering action. The connecting portion 21 of the outer barrel 20 has a center defining a channel 212. A linking lever 22 is received in the channel 212 and has a first end formed with a horizontal bent portion passing through a protruding ear 33 of the bottom of the rear end of the barrel lid 30, and a second end passing through the front end of the outer barrel 20 and pivoted with a pedal 23 which may be stepped *on* so that the linking lever 22 pushes the lid cover 30 to pivot upward as shown in FIG. 7.

The improvement of the present invention will be described as follows.

The lid cover 30 includes an inner cover 34 and an outer cover 35. The inner cover 34 is placed in the inner rim of the outer cover 35. The locking portion 32 of the lid cover 30 is mounted between the inner cover 34 and the outer cover 35. The inner cover 34 has a front end provided with a touch portion 340 that may be pressed so as to pivot the inner cover 34 to move upward independently. The top face of the connecting portion 21 of the outer barrel 20 has a front end defining a hanging recess 213. The inner barrel 10 has a rear side having a top edge provided with a hanging hook portion 11 secured in the hanging recess 213 of the connecting portion 21 of the outer barrel 20 so that the inner barrel 10 can be secured on the front end of the connecting portion 21 of the outer barrel 20. The outer barrel 20 has a back side provided with a hood 240. A plurality of screws 242 each in turn extend through the hood 240, the outer barrel 20, and the connecting portion 21, such that the connecting portion 21 is secured inside of the top portion of the outer barrel 20, and the hood 240 is secured outside of the top portion of the outer barrel 20 to form a handle portion 24 of the outer barrel 20, such that the outer barrel 20 may be portable. In addition, the lid cover 30 of the waste bin structure can be opened by a triggering action, and by a stepping action of a foot so that the waste bin structure of the present invention has dual functions and effects.

Figure 8:
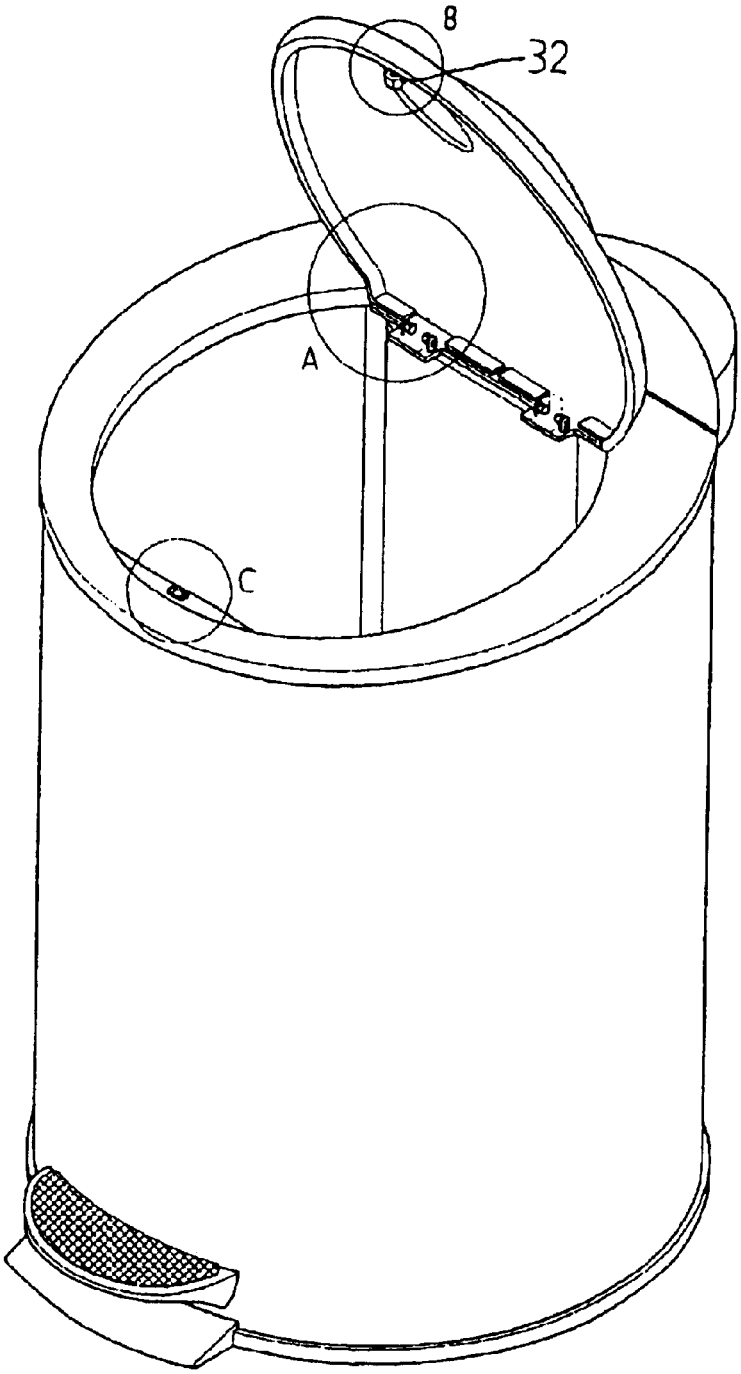
FIG. 8 is a schematic operational view of the waste bin structure as shown in FIG. 1 in use.
Figure 8A:
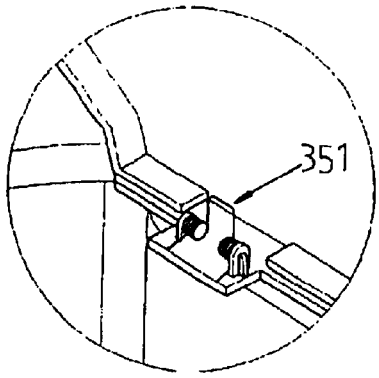
FIG. 8A is a [partially] *partial,* enlarged view of the waste bin structure as shown in FIG. 8.
Figure 8B:
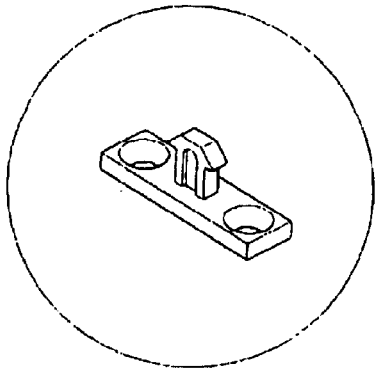
FIG. 8B is a [partially] *partial,* enlarged view of the waste bin structure as shown in FIG. 8.
Figure 8C:
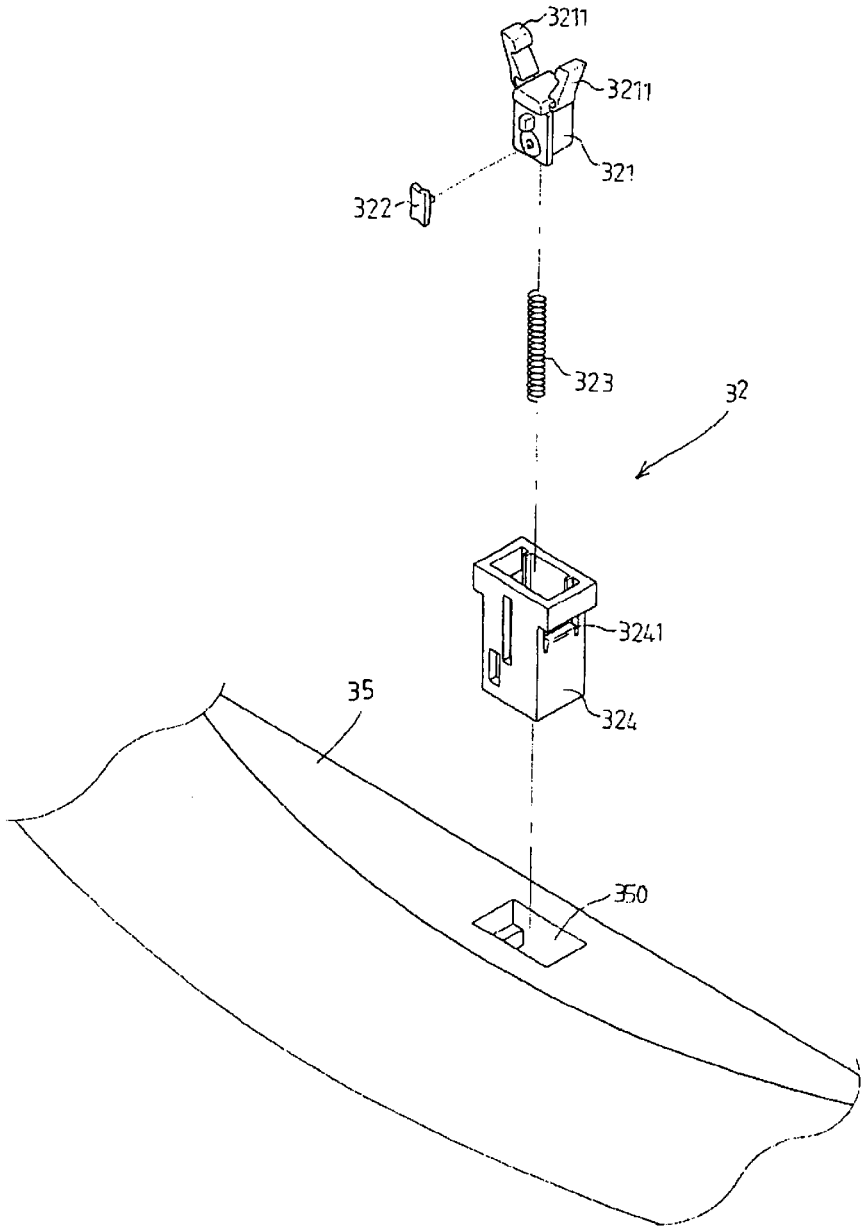
FIG. 8C is a [partially] *partial,* enlarged, exploded perspective view of the waste bin structure as shown in FIG. 8.
Figure 8D:
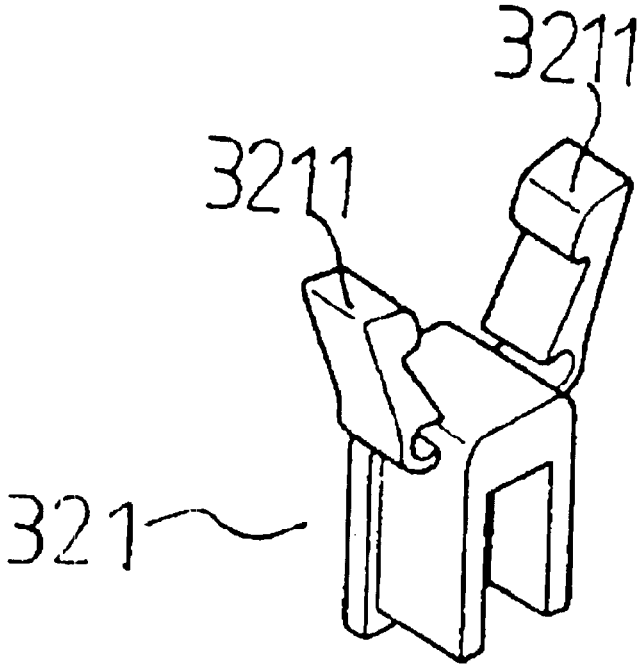
FIG. 8D is a perspective view *of* a clip portion of the waste bin structure as shown in FIG. 8C.
Figure 9:
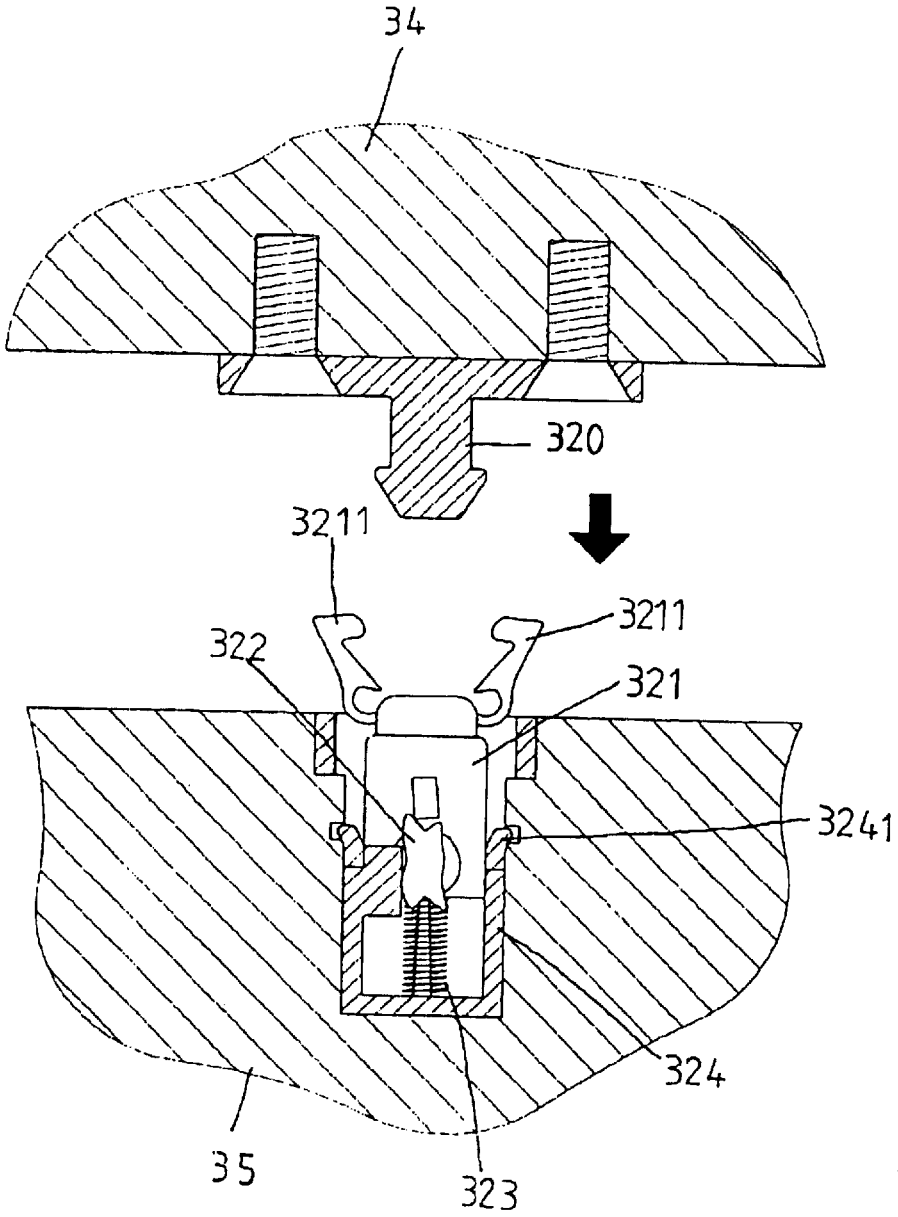
FIG. 9 is a [front plan] *partial,* operational cross-sectional view of the waste bin structure as shown in FIG. 1.
Figure 10:
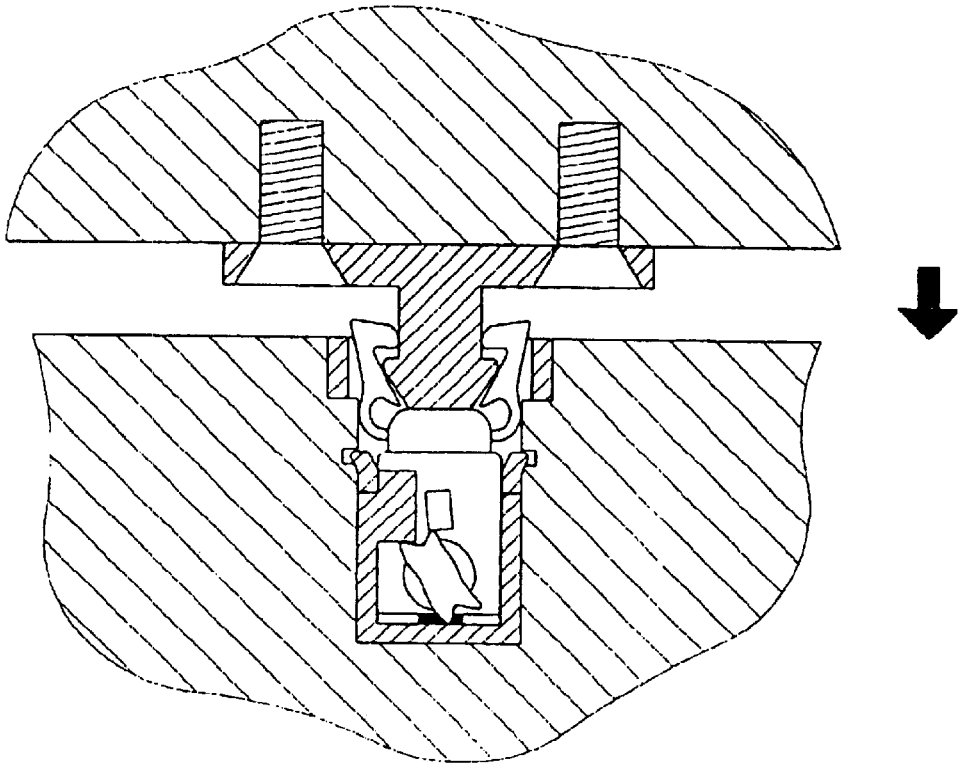
FIG. 10 is [an] *a partial,* operational view of the waste bin structure as shown in FIG. 9.
Figure 11:
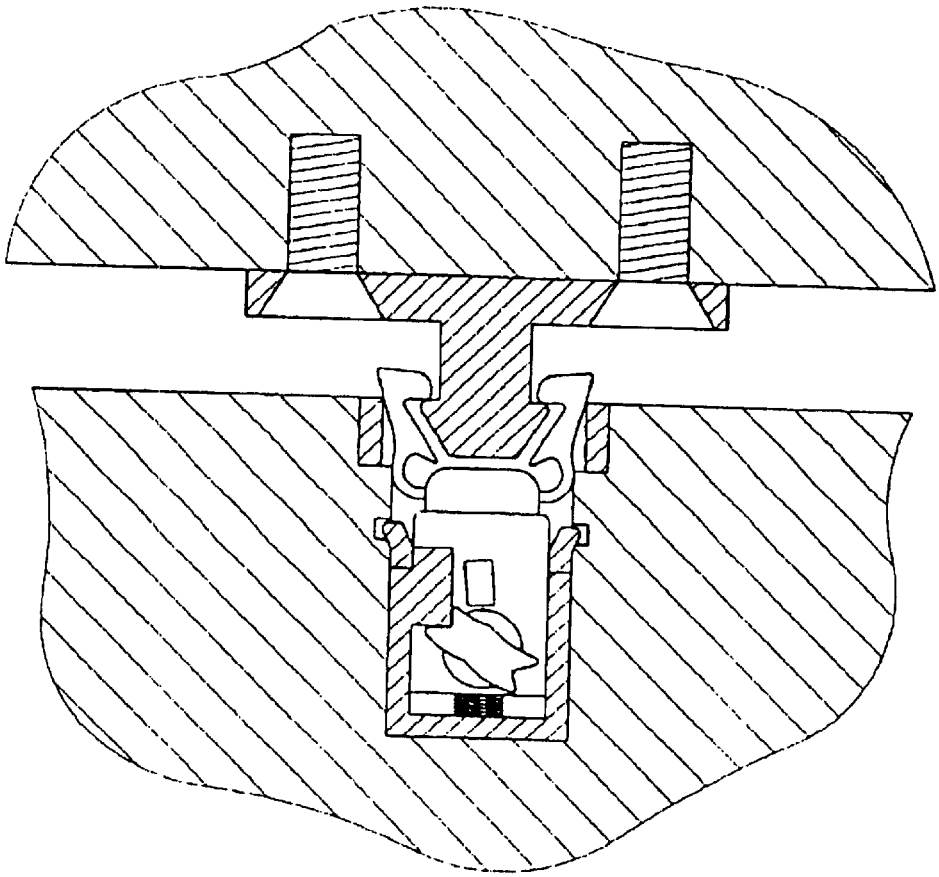
FIG. 11 is [an] *a partial,* operational view of the waste bin structure as shown in FIG. 10.

Referring to FIGS. 7–11, the rear end of the inner edge of the outer cover 35 of the lid cover 30 is provided with an elastic portion 351 as shown in FIG. 8A, for pivoting the distal end of the inner cover 34. When the locking portion 32 of the barrel cover 30 is disposed at a detachment state, the inner cover 34 can be pivoted upward by means of the elasticity of the elastic portion 351. The locking portion 32 of the barrel lid 30 includes a locking head 320, a clip portion 321, a locking piece 322, a spring 323, and a receiving seat 324. The locking head 320 has an arrow shape, and is secured to the front edge of the bottom face of the inner cover 34. The outer cover 35 has an inner edge having a front end defining a receiving recess 350 for receiving the T-shape receiving seat 324 of the locking portion 32. The receiving seat 324 has a side provided with a fixing piece 3241 for securing the receiving seat 324 in the receiving recess 350. The Y-shaped clip portion 321, the locking piece 322, and the spring 323 are received in the receiving seat 324 to operate. When the inner cover 34 is moved downward to press the outer cover 35, the locking head 320 secured on the inner cover 34 presses the clip portion 321 to move downward to compress the spring 323. Then, the clip hooks 3211 of the clip portion 321 are pressed to move toward each other *limited* by [limit of] the opening of the receiving seat 324 so as to clamp the locking head 320, while the locking piece 322 is rotated to be locked in the bottom end of the receiving seat 324 by means of the spring 323, so that the locking head 320 is disposed at a locked state. Then, after the touch portion 340 of the inner cover 34 is pressed, the clip portion 321 of the locking portion 32 will press the spring 323 again, so that the locking piece 322 is rotated to detach from the bottom end of the receiving seat 324. Subsequently, the clip portion 321 and the locking head 320 are moved upward by the restoring force of the spring 323, while the clip hooks 3211 of the clip portion 321 are moved outward relative to each other by means of the flexibility, so as to release the locking head 320, so that *the* locking head 320 is disposed at a detachment state.

Accordingly, the waste bin structure in accordance with the present invention has simple parts that are pivoted with each other, so that the waste bin structure can be assembled easily, and has a cheaper cost of fabrication. In addition, the waste bin structure has an airtight effect so as to prevent wastes contained in the waste bin structure from directly contacting air of the ambient environment, thereby preventing leakage and spread of odor from the waste bin structure.

Although the invention has been explained in relation to its preferred embodiment as mentioned above, it is to be understood that many other possible modifications and variations can be made without departing from the scope of the present invention. It is, therefore, contemplated that the appended claim will cover such modifications and variations that fall within the true scope of the invention.

What is claimed is:

1. A waste bin structure comprising:

an inner barrel (10), an outer barrel (20), and a barrel lid (30), said inner barrel (10) received in said outer barrel (20), a connecting portion (21) mounted on a rear end of an inner rim of said outer barrel (20), said connecting portion (21) having a top face integrally formed with a cover (210), said cover (210) having a front end provided with two hanging shafts (211), said barrel lid (30) having a distal end provided with two hanging ears (31) each snapped on said hanging shaft (211) of said cover (210) so that said barrel lid (30) covers a top edge of said outer barrel (20), said barrel lid (30) provided with a locking portion (32) that is opened and closed by triggering, so that said barrel lid (30) an be opened by triggering action, said connecting portion (21) of said outer barrel (20) having a center defining a channel (212), a linking lever (22) received in said channel (212) and having a first end formed with a horizontal bent portion passing through a protruding ear (33) of a bottom of a rear end of said barrel lid (30), and a second end passing through a front end of said outer barrel (20) and pivoted with a pedal (23) which may be stepped *on* so that said linking lever (22) pushes said lid cover (30) to pivot upward;

the improvement comprising:

said lid cover (30) including an inner cover (34) and an outer cover (35), said inner cover (34) placed in an inner rim of said outer cover (35), said locking portion (32) of said lid cover (30) mounted between said inner cover (34) and said outer cover (35), said inner cover (34) having a front end provided with a touch portion (340) that may be pressed so as to pivot said inner cover (34) to move upward independently, said top face of said connecting portion (21) of said outer barrel (20) having a front end defining a hanging recess (213), said inner barrel (10) having a rear side having a top edge provided with a hanging hook portion (11) secured in said hanging recess (213) of said connecting portion (21) of said outer barrel (20), said outer barrel (20) having a back side provided with a hood (240), a plurality of screws (242) each in turn extending through said hood (240), said outer barrel (20), and said connecting portion (21), so that said connecting portion (21) is secured inside of a top portion of said outer barrel (20), and said hood (240) is secured outside of said top portion of said outer barrel (20) to form a handle portion (24) of said outer barrel (20), such that said outer barrel (20) is portable, and said lid cover (30) of said waste bin structure can be opened by a triggering action, and by a stepping action of a foot.

*2. The waste bin structure of claim 15 further comprising, in combination: an inner barrel, with the inner barrel received in the outer barrel, with the barrel lid in the closed position extending over the inner barrel received in the outer barrel, with the barrel lid in the open position allowing access to the inner barrel received in the outer barrel.*

*3. The waste bin structure of claim 2 wherein the outer cover is in the form of an inner rim, with the inner cover located in the inner rim, with the locking portion mounted between the inner cover and the outer cover.*

*4. The waste bin structure of claim 2 further comprising, in combination: a hanging recess connected with the outer barrel; and a hanging hook portion provided on the inner barrel, with the hanging hook portion removably secured in the hanging recess to secure the inner barrel to the outer barrel.*

*5. The waste bin structure of claim 2 further comprising, in combination: a connecting portion mounted on the outer barrel, with the connecting portion including a top face having a front end defining the hanging recess, with the inner barrel having a rear side having a top edge provided with the hanging hook portion.*

*6. The waste bin structure of claim 5 further comprising, in combination: a cover integrally formed with the top face of the connecting portion, with the cover having a front end provided with two hanging shafts, with the outer cover having a distal end provided with two hanging ears each snapped on a corresponding one of the two hanging shafts for pivotally mounting the barrel lid to the outer barrel.*

*7. The waste bin structure of claim 5 further comprising, in combination: a protruding ear on a bottom of the outer rim, with the connecting portion having a center defining a channel, with the linking lever received in the channel, with the linking lever having a first end formed with a horizontal bent portion passing through the protruding ear, with the linking lever having a second end passing through a front end of the outer barrel and pivoted with the pedal.*

*8. The waste bin structure of claim 5 further comprising, in combination: a hood provided on a back side of the outer barrel; and a plurality of screws each in turn extending through the hood, the outer barrel, and the connecting portion so that the connecting portion is secured inside the outer barrel and so that the hood is secured outside of the outer barrel to form a handle portion for the outer barrel such that the outer barrel is portable.*

*9. The waste bin structure of claim 2 further comprising, in combination: a touch portion provided on a front end of the inner cover and that may be pressed to release the locking portion.*

*10. The waste bin structure of claim 2 further comprising, in combination: an elastic portion provided on a rear end of an inner edge of the outer cover, with the inner cover being biased by elasticity of the elastic portion.*

*11. The waste bin structure comprising, in combination: an outer barrel having a top edge; and a barrel lid, with the barrel lid covering the top edge of the outer barrel, with the barrel lid including an inner cover and an outer cover, with the inner cover being pivotal for movement between a closed position and an open position, with the inner cover being biased from the closed position to the open position, with the inner cover in the closed position preventing access to the outer barrel, with the inner cover in the open position allowing access to the outer barrel between the inner and outer covers; and a locking portion so that the inner cover can move from the closed position to the open position by a triggering action, wherein the locking portion includes first and second clip hooks pressed to move toward each other; and a locking head, with the locking head having a locked state and a detachment state with the first and second clip hooks, with the locking head in the locking state holding the inner cover in the closed position and in the detachment state allowing the inner cover to move from the closed position to the open position.*

*12. The waste bin structure of claim 11 further comprising, in combination: a Y-shaped clip portion including the first and second clip hooks; a locking piece; a spring; and a T-shaped receiving seat, with the locking head having an arrow shape and being secured to the inner cover, with the outer cover defining a receiving recess receiving the*

*T-shaped receiving seat, with the Y-shaped clip portion, the locking piece and the spring received in the T-shaped receiving seat.*

*13. The waste bin structure of claim 12 with the T-shaped receiving seat provided with a fixing piece for securing the T-shaped receiving seat in the receiving recess.*

*14. The waste bin structure of claim 11 with the barrel lid pivotally mounted to the outer barrel for movement between a closed position and an open position, with the barrel lid in the closed position covering the top edge of the outer barrel, with the barrel lid in the open position allowing access to the outer barrel between the top edge of the outer barrel and the barrel lid.*

*15. The waste bin structure of claim 14 further comprising, in combination: a pedal located outside of the outer barrel and which may be stepped upon; and a linking lever connected to the barrel lid and movable by stepping upon the pedal for moving the barrel lid from the closed position to the open position.*

* * * * *